US010682977B2

(12) United States Patent
Maenishi et al.

(10) Patent No.: US 10,682,977 B2
(45) Date of Patent: Jun. 16, 2020

(54) AIR BAG DEVICE

(71) Applicant: AUTOLIV DEVELOPMENT AB, Vargarda (SE)

(72) Inventors: Kai Maenishi, Yokohama (JP); Yutaka Nakajima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 128 days.

(21) Appl. No.: 15/546,211

(22) PCT Filed: Nov. 17, 2015

(86) PCT No.: PCT/JP2015/082245
§ 371 (c)(1),
(2) Date: Jul. 25, 2017

(87) PCT Pub. No.: WO2016/121199
PCT Pub. Date: Aug. 4, 2016

(65) Prior Publication Data
US 2018/0015902 A1 Jan. 18, 2018

(30) Foreign Application Priority Data
Jan. 29, 2015 (JP) ................................. 2015-015461

(51) Int. Cl.
B60R 21/233 (2006.01)
B60R 21/205 (2011.01)
B60R 21/2334 (2011.01)
(52) U.S. Cl.
CPC .......... B60R 21/233 (2013.01); B60R 21/205 (2013.01); B60R 21/2334 (2013.01)

(58) Field of Classification Search
CPC ... B60R 21/205; B60R 21/231; B60R 21/233; B60R 21/2334; B60R 2021/23308
See application file for complete search history.

(56) References Cited

U.S. PATENT DOCUMENTS 7,163,229 B2    1/2007  Hasebe et al.
7,607,683 B2 *  10/2009 Fischer ................. B60R 21/231
                                                280/730.1

(Continued)

FOREIGN PATENT DOCUMENTS

CN        1616278 A      5/2005
DE   60 2004 004 035 T2  7/2007

(Continued)

OTHER PUBLICATIONS

International Search Report for PCT/JP2015/082245, dated Jan. 12, 2016 (English Translation).

Primary Examiner — Barry Gooden, Jr.
(74) Attorney, Agent, or Firm — Dickinson Wright PLLC

(57) ABSTRACT

An airbag device capable of avoiding interference between a cushion and a structure at an upper part of a vehicle interior. An airbag device (100) provided in a vehicle having a prescribed structure (152) such as a rearview mirror suspended from an upper part of a vehicle interior includes a cushion (108) inflated and deployed into a bag shape to restrain an occupant of a seat from a front side, and an avoidance-shaped part (154) provided at an upper part of the cushion (108) to avoid contact between the inflated and deployed cushion (108) and the structure (152), and the avoidance-shaped part (154) is recessed downward over a range between positions at prescribed distances from the structure (152) in vehicle forward and backward directions, respectively.

14 Claims, 9 Drawing Sheets

(56) References Cited

U.S. PATENT DOCUMENTS

| | | | | |
|---|---|---|---|---|
| 7,695,012 | B2* | 4/2010 | Libby | B60R 21/233 |
| | | | | 280/729 |
| 8,056,923 | B2* | 11/2011 | Shinnono | B60R 21/207 |
| | | | | 280/729 |
| 8,366,145 | B2* | 2/2013 | Choi | B60R 21/2346 |
| | | | | 280/729 |
| 8,662,527 | B2* | 3/2014 | Sato | B60R 21/205 |
| | | | | 280/729 |
| 8,876,156 | B2 | 11/2014 | Turnbull et al. | |
| 9,421,935 | B2* | 8/2016 | Fukawatase | B60R 21/205 |
| 9,434,344 | B2* | 9/2016 | Fukawatase | B60R 21/2338 |
| 9,731,677 | B1* | 8/2017 | Belwafa | B60R 21/233 |
| 10,040,416 | B2* | 8/2018 | Fukawatase | B60R 21/231 |
| 10,065,594 | B2* | 9/2018 | Fukawatase | B60R 21/233 |
| 10,363,895 | B2* | 7/2019 | Yamada | B60R 21/2338 |
| 2002/0063416 | A1* | 5/2002 | Kamaiji | B60R 21/231 |
| | | | | 280/728.2 |
| 2005/0104340 | A1 | 5/2005 | Hasebe et al. | |
| 2008/0143086 | A1* | 6/2008 | Higuchi | B60R 21/233 |
| | | | | 280/736 |
| 2011/0260431 | A1* | 10/2011 | Kwon | B60R 21/2338 |
| | | | | 280/730.1 |
| 2012/0193896 | A1 | 8/2012 | Turnbull et al. | |
| 2012/0261910 | A1* | 10/2012 | Fischer | B60R 21/205 |
| | | | | 280/732 |
| 2013/0087997 | A1* | 4/2013 | Sekino | B60R 21/205 |
| | | | | 280/732 |
| 2014/0339798 | A1* | 11/2014 | Motomochi | B60R 21/231 |
| | | | | 280/732 |
| 2015/0166002 | A1* | 6/2015 | Fukawatase | B60R 21/233 |
| | | | | 280/730.1 |
| 2015/0258958 | A1* | 9/2015 | Belwafa | B60R 21/233 |
| | | | | 280/729 |
| 2015/0367802 | A1* | 12/2015 | Fukawatase | B60R 21/205 |
| | | | | 280/732 |
| 2016/0009242 | A1* | 1/2016 | Fukawatase | B60R 21/205 |
| | | | | 280/730.1 |
| 2016/0046257 | A1* | 2/2016 | Yamada | B60R 21/2338 |
| | | | | 280/729 |
| 2017/0015270 | A1* | 1/2017 | Ohno | B60R 21/233 |
| 2018/0001863 | A1* | 1/2018 | Nakanishi | B60R 21/203 |
| 2018/0037188 | A1* | 2/2018 | Ohno | B60R 21/262 |
| 2018/0065587 | A1* | 3/2018 | Maenishi | B60R 21/205 |
| 2018/0154856 | A1* | 6/2018 | Yamada | B60R 21/231 |
| 2018/0222431 | A1* | 8/2018 | Nakanishi | B60R 21/231 |
| 2018/0251093 | A1* | 9/2018 | Rose | B60R 21/01552 |
| 2018/0354450 | A1* | 12/2018 | Yamada | B60R 21/23138 |

FOREIGN PATENT DOCUMENTS

| | | |
|---|---|---|
| EP | 1 531 097 A1 | 5/2005 |
| JP | 5-170041 A | 7/1993 |
| JP | H0624283 A | 2/1994 |
| JP | 2000085516 A | 3/2000 |
| JP | 2005-145225 A | 6/2005 |

* cited by examiner

AIR BAG DEVICE

CROSS-REFERENCE TO RELATED APPLICATIONS

This application is a 35 U.S.C. § 371 national phase application of International Application No.: PCT/JP2015/082245, filed Nov. 17, 2015, which claims the benefit of priority under 35 U.S.C. § 119 to Japanese Patent Application Serial No.: 2015-015461, filed Jan. 29, 2015, the contents of which are incorporated herein by reference in their entirety.

FIELD OF THE INVENTION

The present invention relates to an airbag device that restrains an occupant in a motor vehicle.

BACKGROUND

In recent years, airbag devices have become standard equipment for most motor vehicles. The airbag device is a safety device activated upon an emergency such as a vehicle collision to receive and protect an occupant using a cushion inflated and deployed by gas pressure. There are different kinds of airbag devices for various installation locations or uses. For example, in order to protect the occupant of the front seat against an impact given mainly in the front-back direction, a front airbag is provided in the center of the steering at the driver seat, and a passenger airbag is provided in the vicinity of a front passenger seat at the instrument panel or any other location. In addition, in order to protect occupants of the front and back seats against a side collision and a subsequent roll over (turn over), a curtain airbag to be inflated and deployed along the side windows is provided at the wall part near the ceiling, and a side airbag to be inflated and deployed just beside an occupant is provided at the side of a seat.

Among the various airbag devices described above, cushions for the front airbag and the passenger airbag that restrain occupants in the front seats are provided generally in front of the occupants in the vehicle. For example, in the airbag device disclosed in Japanese Patent Application Publication No.: H6-24283, airbags for a driver's seat and a front passenger seat are provided in front of the driver's seat and the front passenger seat, and an airbag for a center seat is provided in front of the center seat. The above-referenced document shows, for example, how the cushion of the airbag for the front passenger seat is inflated and deployed from the upper part of an instrument panel to fill the space between the instrument panel and the windshield.

SUMMARY

However, as disclosed in Japanese Patent Application Publication No.: H6-24283, a rear view mirror may be present in the range of inflation and deployment of the cushion of the front passenger seat airbag. The rear view mirror is typically suspended from the roof, windshield, etc. in the center in the vehicle-widthwise direction. If the cushion interferes with the rear view mirror, the behavior of the cushion in the process of deployment may become instable or the cushion may not be inflated or deployed to a target region, which may influence the capability of restraining the occupant. If the cushion pushes the rear view mirror backward from the vehicle front side during its inflation and deployment, the mirror may become separated.

The present invention is in view of the previously described problem and it is an object of the present invention to provide an airbag device capable of avoiding interference between the cushion and a structure at the upper part of the vehicle interior.

In order to solve the problem, an exemplary configuration of an airbag device according to the present invention is an airbag device provided in a vehicle having a prescribed structure suspended from an upper part of a vehicle interior (such as a rear view mirror), the airbag device includes a cushion inflated and deployed into a bag shape to restrain an occupant of a seat from a front side and an avoidance-shaped part provided at an upper part of the cushion to avoid contact between the inflated and deployed cushion and the structure, and the avoidance-shaped part is recessed downward over a range between positions at prescribed distances from the structure in vehicle forward and backward directions, respectively.

In this way, for example even if a structure such as a rear view mirror and a prescribed display is provided at the upper part of the vehicle interior, the avoidance-shaped part provided at the upper part of the cushion is recessed downward over a range between positions at prescribed distances from the structure in the vehicle forward and backward directions, respectively. More specifically, the cushion is configured to avoid contact with the structure in the process of and at the completion of its inflation and deployment and during the following period for restraining the occupant. Therefore, the cushion can be inflated and deployed accurately to a target region exactly in a set manner of deployment behavior. The cushion also avoids, for example, contact with the structure when the cushion restrains the occupant after the completion of its inflation and deployment, and therefore generation of reaction force that would otherwise be caused by the contact between the cushion and the structure can be prevented, so that the cushion can provide restraining capability as expected.

In the configuration according with this invention, the cushion in the process of inflation and deployment does not contact a rear view mirror or other structure, and therefore the rear view mirror etc. can be prevented from becoming detached. The presence of the avoidance-shaped part reduces the volume for the amount, the amount of base fabric for forming the cushion can be reduced, and a lower cost smaller power inflator may be used, which can contribute to reduction of the cost.

The cushion restrains an occupant of one of left and right seats, and the avoidance-shaped part may be provided at an upper part of the cushion on a vehicle inner side in a vehicle widthwise direction. For example, the structure provided at the upper part of the vehicle interior such as a rear view mirror and a prescribed display is often provided in the center in the vehicle widthwise direction. Therefore, in the above-described configuration, a cushion for one of the left and right seats is provided with the avoidance-shaped part on the vehicle inner side in the vehicle widthwise direction in order to efficiently avoid the structure.

The avoidance-shaped part may be recessed in a range positioned higher than the trajectory of the center of gravity of the head of the occupant when the occupant is restrained. By the configuration, the head of the occupant can be fully restrained while the avoidance-shaped part is provided.

The airbag device may further include a housing having a box shape, storing the cushion and provided inside an upper surface part of an instrument panel of the vehicle, and the cushion may tear open the upper surface part of the instrument panel to be inflated and deployed. By this configuration, the airbag device can be optimally implemented as a device for a front seat.

The cushion may be inflated and deployed to contact a windshield of the vehicle and the upper surface part of the instrument panel of the vehicle. More specifically, the cushion may be inflated and deployed as if sandwiched between the windshield and the instrument panel. By the configuration, the cushion can restrain the occupant entering from the back side in the vehicle in a stable position using the windshield and the instrument panel as a support.

Another exemplary configuration of the airbag device according to the present invention is an airbag device provided in a vehicle having a prescribed structure suspended from an upper center of a vehicle interior in a vehicle widthwise direction, the airbag device includes a main bag inflated and deployed ahead of a seat, a center bag inflated and deployed on an inner side of the main bag in the vehicle widthwise direction, and an avoidance-shaped part provided at an upper part of the center bag and recessed at least downward to avoid contact between the center bag and the structure.

For example, even if a structure such as a rear view mirror and a prescribed display is provided at an upper part of the vehicle interior, the presence of the avoidance-shaped part can prevent the center bag from contacting the structure. The center bag optimally functions when the occupant enters therein obliquely forward to the vehicle inner side for example in a so-called oblique collision that applies an impact upon the vehicle obliquely in the front-back direction. In an oblique collision, a rear view mirror, etc. may be present in the moving direction of the occupant and the center bag having restrained the occupant. However, because the contact with the rear view mirror, etc. is avoided by the avoidance-shaped part, the center bag can provide restraining capability as set without being caught by the rear view mirror, etc. or receiving unexpected reaction force from the rear view mirror, etc.

In the configuration, the center bag does not contact the rear view mirror, etc. and therefore the rear view mirror, etc. can be prevented from dropping and being shattered. In addition, the presence of the avoidance-shaped part reduces the volume for the amount, the amount of base fabric for forming the center bag can be reduced, and therefore an inexpensive smaller power inflator may be used, which can contribute to reduction of the cost.

The avoidance-shaped part may be recessed downward over a range between positions at prescribed distances from the structure in vehicle forward and backward directions, respectively. With the avoidance-shaped part, the center bag is configured to avoid contact with the structure in the process of and at the completion of its inflation and deployment and during the following period for restraining the occupant. In this way, the center bag can be inflated and deployed accurately to a target region exactly in a set manner of deployment behavior. The center bag also avoids contact with the structure when the center bag restrains the occupant after the completion of inflation and deployment, and therefore, for example, generation of reaction force that would otherwise be caused by the contact between the center bag and the structure can be prevented, so that the center bag can provide restraining capability as set.

The avoidance-shaped part may be recessed in a range positioned higher than the trajectory of the center of gravity of the head of the occupant when the occupant is restrained. Also by the configuration, the head of the occupant can be fully restrained while the avoidance-shaped part is provided.

The airbag device may further include a rear region provided behind the avoidance-shaped part in the center bag and protruding above a lower end of the structure. The presence of the rear region allows the occupant, particularly the head of the occupant to be restrained efficiently.

The center bag may protrude beyond the main bag in a vehicle backward direction during inflation and deployment. As described above, in an oblique collision, the occupant may move obliquely forward to the vehicle inner side. In the case, when the head of the occupant contacts the main bag in the front, clockwise rotation around the neck as an axis may be generated at the head as viewed from above. Therefore, for example in the above-described configuration, the center bag provided on the vehicle inner side of the main bag protrudes beyond the main bag in the vehicle backward direction. In the configuration, the head of the occupant moving obliquely forward to the vehicle inner side contacts the main bag in the front and the center bag mainly from the side head part simultaneously or immediately before or after the contact with the main bag. In this way, the clockwise rotation of the head can be reduced or cancelled. In particular, the angular velocity of the rotation of the head of the occupant can be reduced, injury values related to the occupant associated with the rotation can be reduced.

The airbag device may further include a front region provided ahead of the avoidance-shaped part in the center airbag and protruding above the lower end of the structure. The presence of the front region allows the center bag to more easily contact the windshield. By contacting the windshield, the center bag can efficiently restrain the occupant using the windshield as a support. The center bag may be inflated and deployed to contact the windshield of the vehicle and the upper surface part of the instrument panel of the vehicle. The restraining capability of the center bag may be further improved as the center bag is inflated and deployed as if sandwiched between the windshield and the instrument panel.

The main bag and the center bag are bag-shaped, and the airbag device may further include a cushion connecting part that connects the main bag and the center bag at least ahead of a rear edge of the main bag, and the head of the occupant may be restrained by a valley between the main bag and the center bag behind the cushion connecting part.

By the configuration, when the occupant moves obliquely forward to the vehicle inner side for example in an oblique collision, the head of the occupant is restrained as the head is received at the entrance of the valley provided between the center bag and the main bag or as the head enters into the valley. Particularly in the above-described configuration, the center bag and the main bag are connected by the cushion connecting part in a prescribed location of the valley. In the configuration, the valley can be kept narrow. Therefore, when the head of the occupant enters into the valley, the head can be restrained as if sandwiched between the side parts of the center bag and the main bag on the sides of the head. In addition, the cushion connecting part is present on the vehicle front side of the head entering into the valley, the load received from the head can be optimally absorbed by the cushion connecting part. Therefore, the configuration can provide high restraining capability to restrain the head of the occupant in an oblique collision, and the injury values can be reduced.

The airbag device may further include a housing having a box shape, storing the main bag and the center bag and provided inside the upper surface part of the instrument panel of the vehicle, and the main bag and the center bag may tear open the upper surface part of the instrument panel to be inflated and deployed. By the configuration, the airbag device can be optimally implemented as a device for a front seat.

According to the present invention, an airbag device capable of avoiding interference between a cushion and a structure at an upper part of a vehicle interior can be provided.

DETAILED DESCRIPTION

Figure 1A:
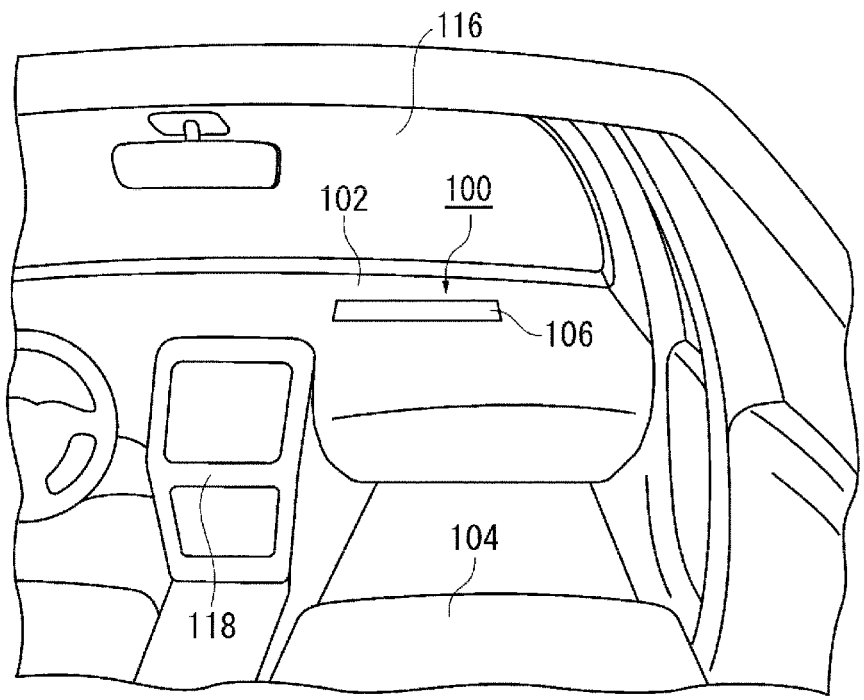
FIGS. 1(a) and (b) are exemplary views of a general configuration of an airbag device according to an embodiment of the present invention.

A preferred embodiment of the present invention will be described in detail in conjunction with the accompanying drawings. The sizes, materials, and other specific numerical values in the following description of the embodiment are simply by way of examples for easier understanding of the present invention and should not be construed to limit the present invention unless otherwise specified. Note that in the description and the drawings, elements having substantially the same functions and configurations are designated by the same reference characters, their description is not repeated, and elements not directly relevant to the present invention are not shown. In all the drawings of the present application, the arrows "forward," "backward," "leftward," "rightward," "upward," and "downward" refer to the vehicle forward direction (advancing direction), the vehicle backward direction (rearward direction), the leftward and rightward directions while one faces the vehicle front, and the upward and downward directions, respectively.

FIGS. 1(a) and (b) are exemplary views of a general configuration of an airbag device 100 according to an embodiment of the present invention. FIG. 1(a) is an exemplary view of a vehicle before the airbag device 100 is activated. According to the embodiment, the airbag device 100 is implemented as a device for a front seat, particularly a front passenger seat 104 (the right seat in the front row) in a left-hand drive car. The airbag device 100 is provided inside an upper surface part 106 of an instrument panel 102 on the side of the front passenger seat 104.

Figure 1B:
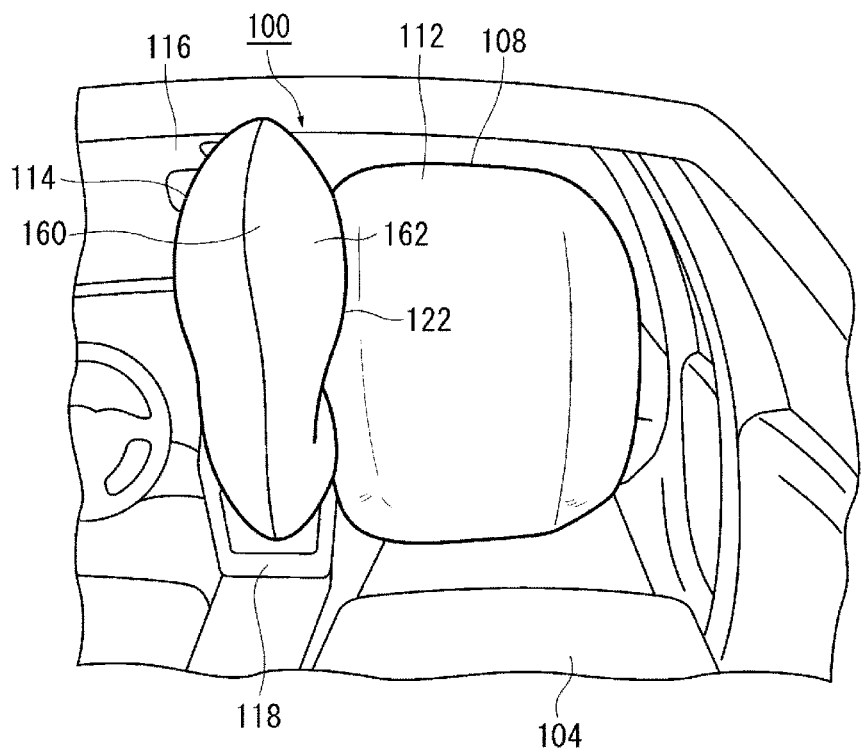

Upon receiving an impact detection signal from a sensor (not shown), the airbag device 100 causes the cushion 108 (see FIG. 1(b)) to tear open the upper surface part 106 of the instrument panel and to be inflated and deployed in the vehicle backward direction. FIG. 1(b) is an exemplary view of the vehicle after the airbag device 100 is inflated and deployed. The cushion 108 of the airbag device 100 restrains an occupant 132 (see for example FIG. 5(a)) of the front passenger seat 104 from the vehicle front side. The cushion 108 has a bag shape and is inflated and deployed by gas supplied from an inflator 110 (see FIG. 5(a)). The cushion 108 is formed for example by sewing or adhering together a plurality of base fabrics placed on one another to form its surface or by spinning and weaving using an OPW (One-Piece Woven).

The cushion 108 of the airbag device 100 includes two parts, a main bag 112 and a center bag 114. The main bag 112 is a part with a larger capacity that is inflated and deployed in front of the front passenger seat 104. The main bag 112 is inflated and deployed to fill the space between the occupant 132 of the front passenger seat 104 (see FIG. 5(a)) and the instrument panel 102 and the windshield 116. In this way, the occupant 132 is protected against collision to the instrument panel 102. As the occupant 132 is also protected against collision with the windshield 116, the occupant 132 is also restrained from being thrown out from the vehicle.

The center bag 114 is a flat part with a smaller capacity than the main bag 112 and inflated and deployed adjacent to the vehicle inner side of the main bag 112. The center bag 114 is inflated and deployed in front of a center console 118 as viewed from the occupant 132 (see FIG. 6(b)) and prevents the occupant 132 from moving to the vehicle inner side or hitting the center console 118 for example in an oblique collision.

Figure 2A:
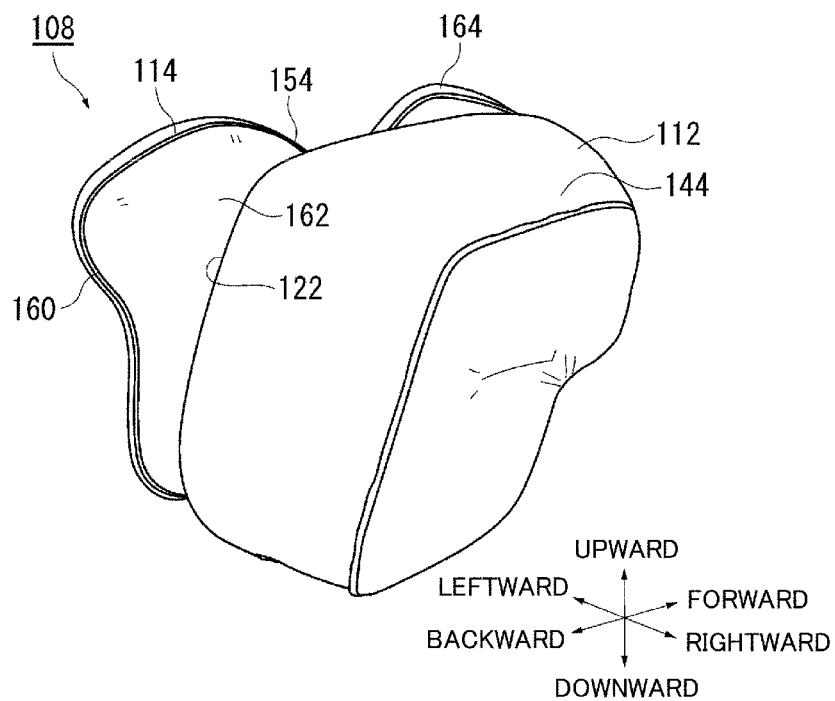
FIGS. 2(a) and (b) are exemplary views of a cushion in FIG. 1(b) in an inflated and deployed state as illustrated in various directions.

FIGS. 2(a), (b) and (c) and 3(a) and (b) are exemplary views of the inflated and deployed cushion 108 in FIG. 1(b) in various directions. FIG. 2(a) is an exemplary perspective view of the cushion 108 in FIG. 1(b) as viewed from above on the vehicle outer side. The center bag 114 and the main bag 112 each have a substantially independent bag shape, and a valley 122 is formed between the bags. The valley 122 extends in the vehicle front-back direction and the vehicle up-down direction between the center bag 114 and the main bag 112. When the cushion 108 is inflated and deployed, the center bag 114 and the main bag 112 are in contact with each other and the valley 122 is in a closed state. According to the embodiment, the valley 122 is used as a space for restraining the occupant 132 (see FIG. 6(c)), particularly the head E1. Note that the center bag 114 and the main bag 112 are connected for example by an internal vent hole on the vehicle front side of the valley 122 in some cases.

Figure 2B:
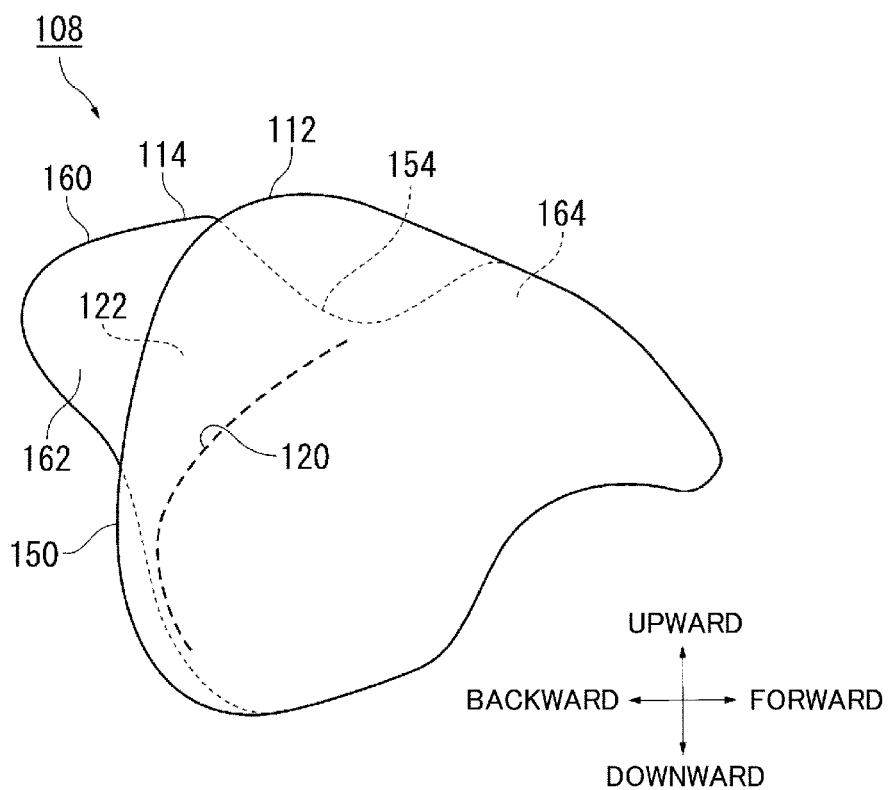

FIG. 2(b) is an exemplary view of the cushion 108 in FIG. 2(a) as viewed from the vehicle outer side. As illustrated in FIG. 2(b), a rear region 160 on the vehicle rear side of the center bag 114 according to the embodiment protrudes beyond the main bag 112 in the vehicle backward direction (leftward in FIG. 2(b)) during inflation and deployment. Therefore, the side surface part 162 of the center bag 114 on the vehicle outer side is exposed from the valley 122. The center bag 114 restrains mainly the side head part E1a of the occupant 132 (see FIG. 6(c)) by the side surface part 162 on the vehicle rear side.

A cushion connecting part 120 connects the center bag 114 and the main bag 112 over a prescribed range in the up-down direction at least in the front of a rear edge 150 of the main bag 112. According to the embodiment, the cushion connecting part 120 is implemented by sewing. The center bag 114 has a flat shape and is inflated and deployed from above and rearward from the instrument panel 102, while the bag is connected to the main bag 112 by the cushion connecting part 120 and can be kept in a stable position without moving to the vehicle inner side. When the head E1 of the occupant 132 (see FIG. 5(c)) is restrained by the valley 122, the cushion connecting part 120 keeps the valley 122 narrow, and therefore the head E1 can be efficiently restrained.

Figure 3A:
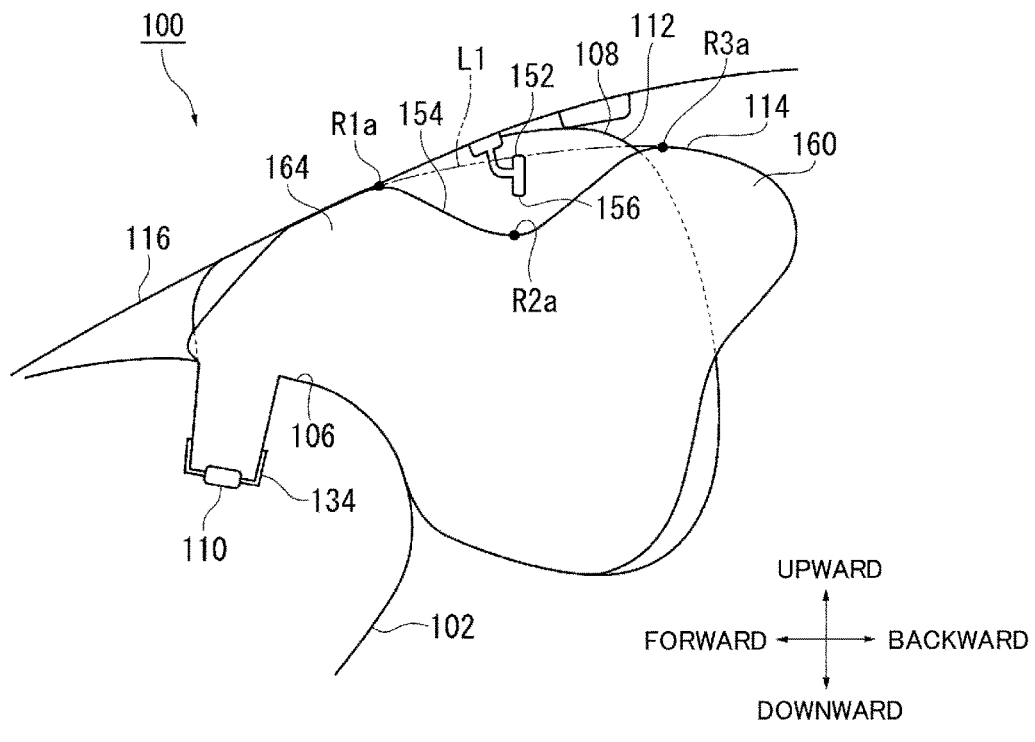
FIGS. 3(a) and (b) are exemplary views of the cushion in FIG. 2(b) in an inflated and deployed state as illustrated in various directions.

FIGS. 3(a) and (b) are exemplary views of the inflated and deployed cushion in FIG. 2(b) in various directions. FIG. 3(a) is an exemplary view of the cushion 108 in FIG. 2(b) as viewed from the inner side of the vehicle. In a general vehicle, a structure 152 such as a rear view mirror is often suspended from an upper center of the vehicle interior in the vehicle widthwise direction. The structure 152 may be any of various items other than the rear view mirror that include a display that displays the state outside the vehicle, a camera or radar that obtains images in a prescribed direction, a sensor that detects raindrops or the brightness of the outside of the vehicle, a vehicle room lamp, a switch for a lamp, control switches for various kinds of auxiliary equipment such as an air conditioner, a movable glove compartment, a rear seat monitor, an opening/closing lock lever for a roof (hard top or soft top), an antenna, and garnishes for various devices. One or more such structures may be provided in the vehicle. The airbag device 100 is provided with an avoidance-shaped part 154 in order to avoid contact between these structures 152 and the cushion 108.

According to the embodiment, as illustrated in FIG. 3(a), the avoidance-shaped part 154 is recessed downward over a range between positions at prescribed distances from the structure 152 in the vehicle forward and backward directions (leftward and rightward in FIG. 3(a)), respectively. The presence of the avoidance-shaped part 154 allows the center bag 114 to avoid contact with the structure 152 in the process of and at the completion of its inflation and deployment and during the following period for restraining the occupant 132 (see FIG. 5(c)). In this way, the avoidance-shaped part 154 according to the embodiment is recessed downward to avoid contact with the structure 152, and without the avoidance-shaped part 154, the center bag 114 would contact the structure 152. More specifically, as illustrated in FIG. 3(a), at least a part of the structure 152 enters into the space defined by the recess of the avoidance-shaped part 154, so that the bag avoids contact with the structure 152.

Stated differently, the avoidance-shaped part 154 starts to be recessed from the positions of R1a and R3a located prescribed distances apart from the structure 152 in the forward and backward directions and above the lower end 156 of the structure 152. For example, in FIG. 3(a), if the center bag 114 is not provided with the avoidance-shaped part 154, the upper edge of the center bag 114 would move in a parabola indicated by the virtual line L1 and overlap the structure 152. According to the embodiment, the avoidance-shaped part 154 is provided to prevent the upper edge of the center bag 114 from moving on the virtual line L1. The presence of the avoidance-shaped part 154 allows the upper edge of the center bag 114 to move on a curved line where the heights of the first point R1a as the peak of a front region 164, the second point R2a immediately under the structure 152 in the avoidance-shaped part 154, and the third point R3a as the peak of a rear region 160 are defined as third point R3a>first point R1a>second point R2a.

Figure 4:
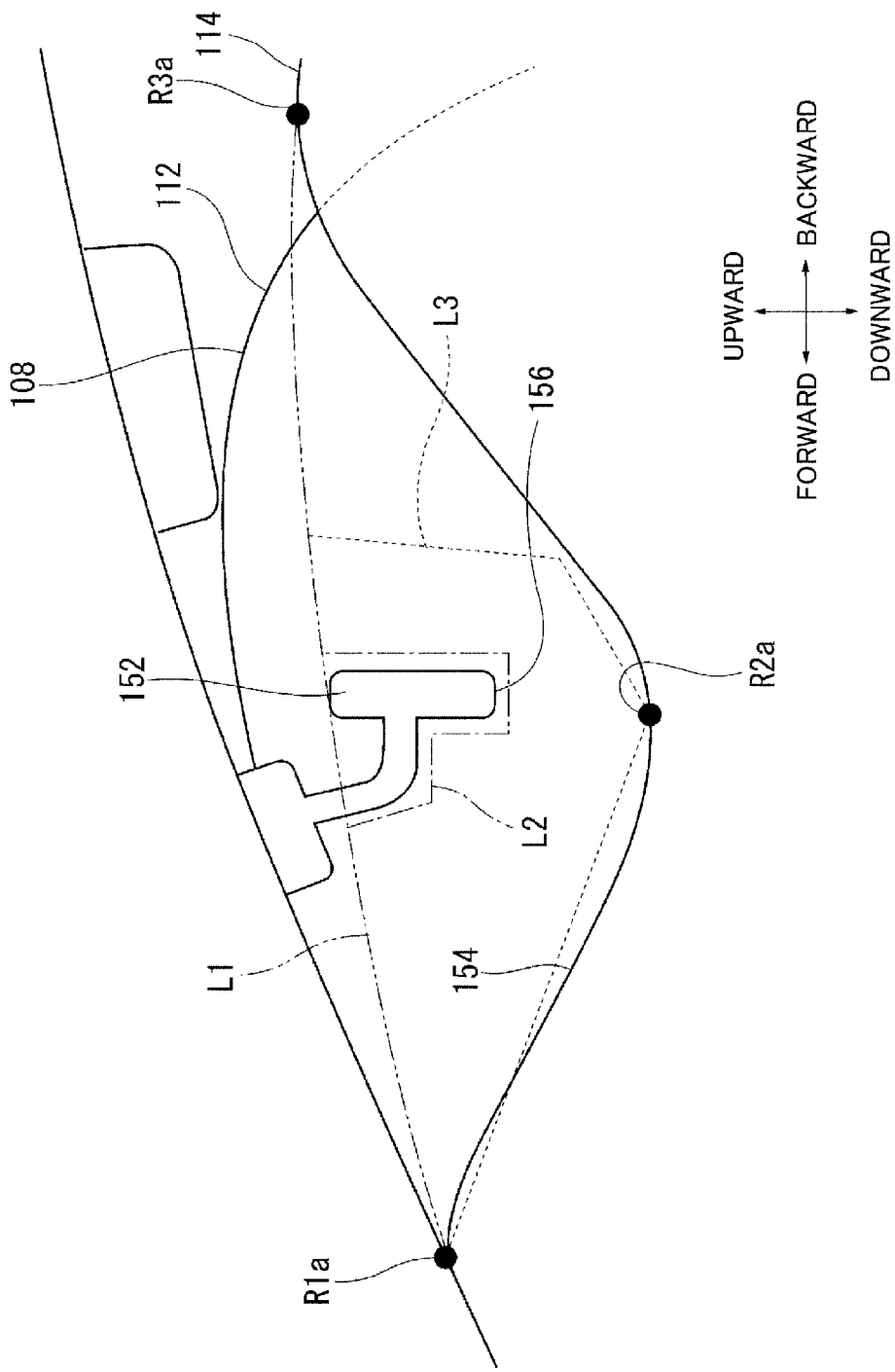
FIG. 4 is a partly enlarged view of FIG. 3(a).

FIG. 4 is a partly enlarged view of FIG. 3(a). Now, the reason why the starting points for the recess of the avoidance-shaped part 154 are R1a and R3a positioned prescribed distances apart from the structure 152 to the front and back will be described. The purpose of providing the avoidance-shaped part 154 is to prevent the center bag 114 from contacting the structure 152. Therefore, to this end, it may be only necessary that the avoidance-shaped part 154 is recessed just along the contour of the structure 152 as indicated by a dashed line L2 when the cushion 108 is completely inflated and deployed. However, if the avoidance-shaped part 154 is recessed along the dashed line L2, the center bag 114 would contact the structure 152 in the process of inflation and deployment before completion.

Therefore, if the avoidance-shaped part 154 is recessed in a shape indicated by a broken line L3 when the cushion 108 is completely inflated and deployed, the center bag 114 does not contact the structure 152 in the process of inflation and deployment. This is because the broken line L3 defines a shape having larger spaces ahead of and behind the structure 152 than that defined by the dashed line L2 as shown in FIG. 4. In the process of inflation and deployment, the cushion 108 moves from the front to the back, the avoidance-shaped part 154 approaching the structure 152 from below allows the structure 152 to enter therein while moving toward the back. Stated differently, the broken line L3 passes a position shifted to the front before arriving at the final position shown in FIG. 4. However, the avoidance-shaped part 154 has a shape having a larger space behind the structure 152 as described above, the avoidance-shaped part 154 allows the structure 152 to enter therein, and the center bag 114 does not contact the structure 152.

Figure 5C:
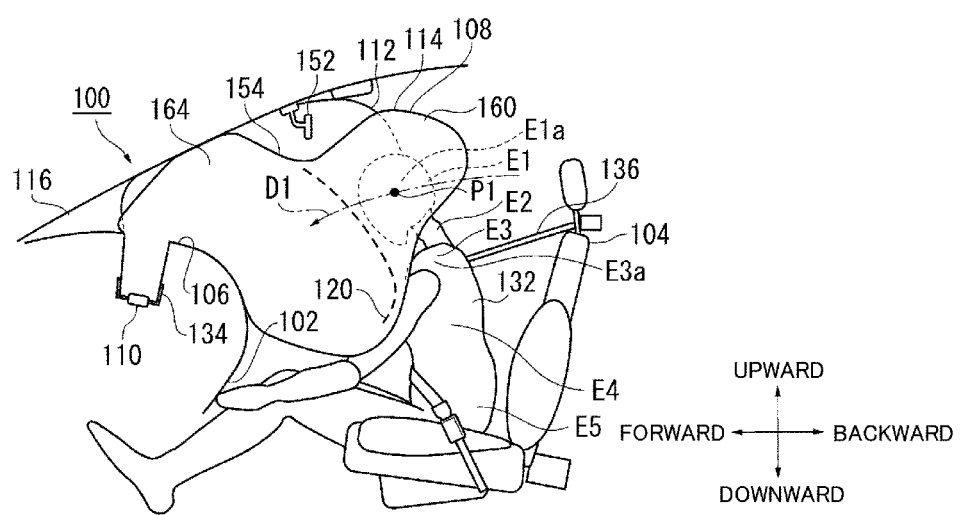
Figure 6A:
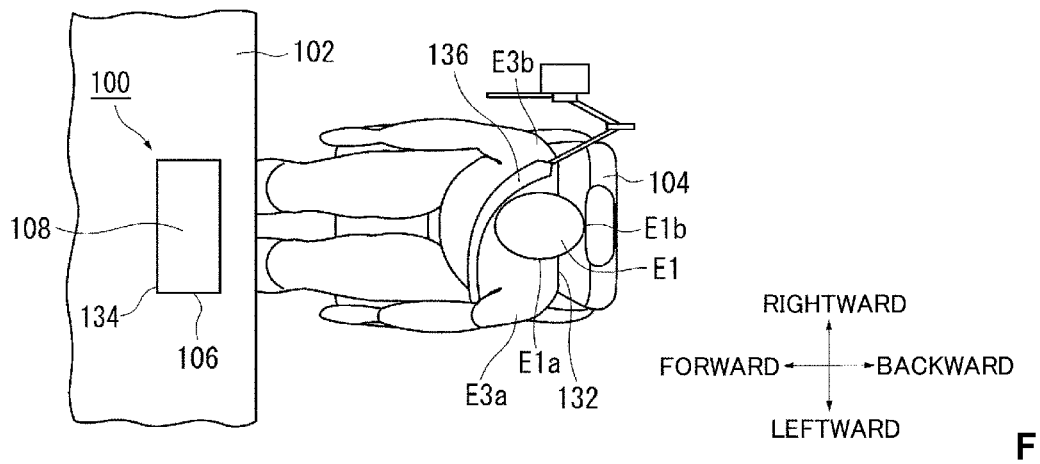
FIGS. 6(a), (b) and (c) are exemplary views illustrating the process of restraining the occupant by the cushion in FIGS. 5(a), (b) and (c) as viewed from above.
Figure 6B:
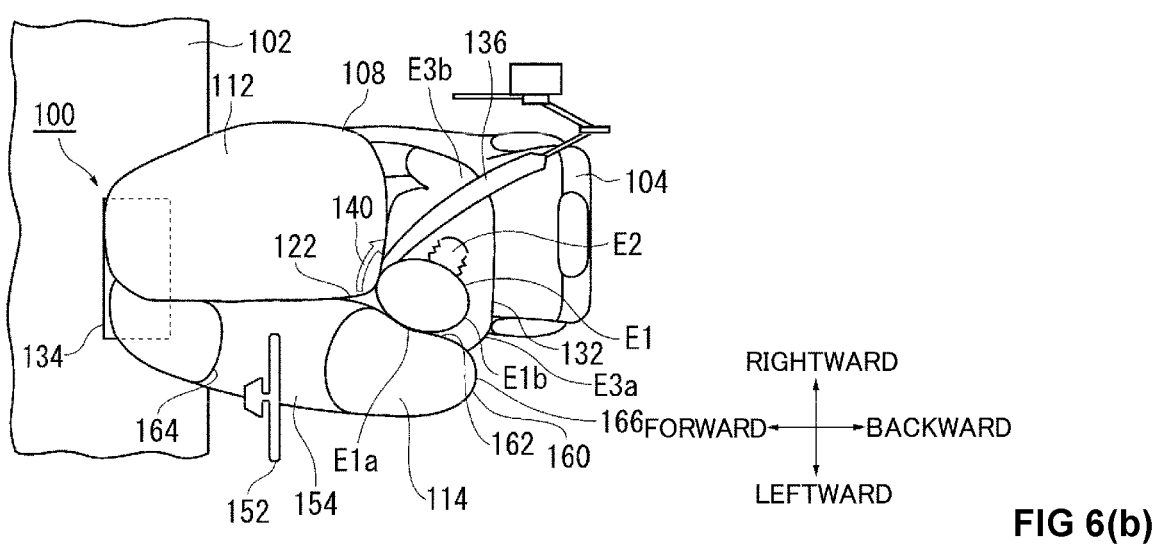
Figure 6C:
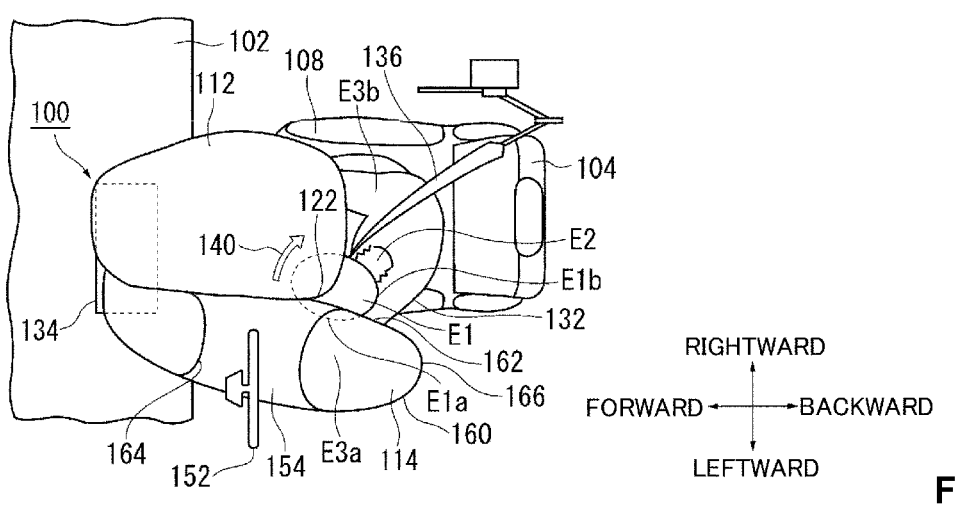

However, the avoidance-shaped part 154 in practice has a shape having an additional space behind the structure 152 as compared to that defined by the broken line L3. This is to prevent the center bag 114 from contacting the structure 152 after the inflation and deployment while the occupant is restrained. When the occupants 132 enters deeply toward the cushion 108 as shown in FIGS. 5(c) and 6(c), the center bag moves forward while sinking to the lower left as viewed from the occupant 132. At the time, the clearance behind the structure 152 defined by the broken line L3 shown in FIG. 4 is not large enough to avoid the contact between the center bag 114 and the structure 152. Therefore, the avoidance-shaped part 154 has a shape having the additional space behind the structure 152 as compared to that defined the broken line L3, in other words the start of the recess of the shape is at the position of the point R3a in FIG. 4.

The rear region 160 is a region of the center bag 114 positioned behind the avoidance-shaped part 154. The rear region 160 serves as a part to restrain the occupant 132 (see FIG. 5(b)), particularly the head E1. The rear region 160 according to the embodiment protrudes above the lower end 156 of the structure 152 and allows the side head part E1a of the occupant 132 to be restrained efficiently.

The front region 164 is a region of the center bag 114 positioned ahead of the avoidance-shaped part 154. The front region 164 supports the center bag 114 by contacting the windshield 116 when the occupant is restrained. The front region 164 is provided to protrude above the lower end 156 of the structure 152 and secures a contact area with the windshield 116.

Figure 3B:
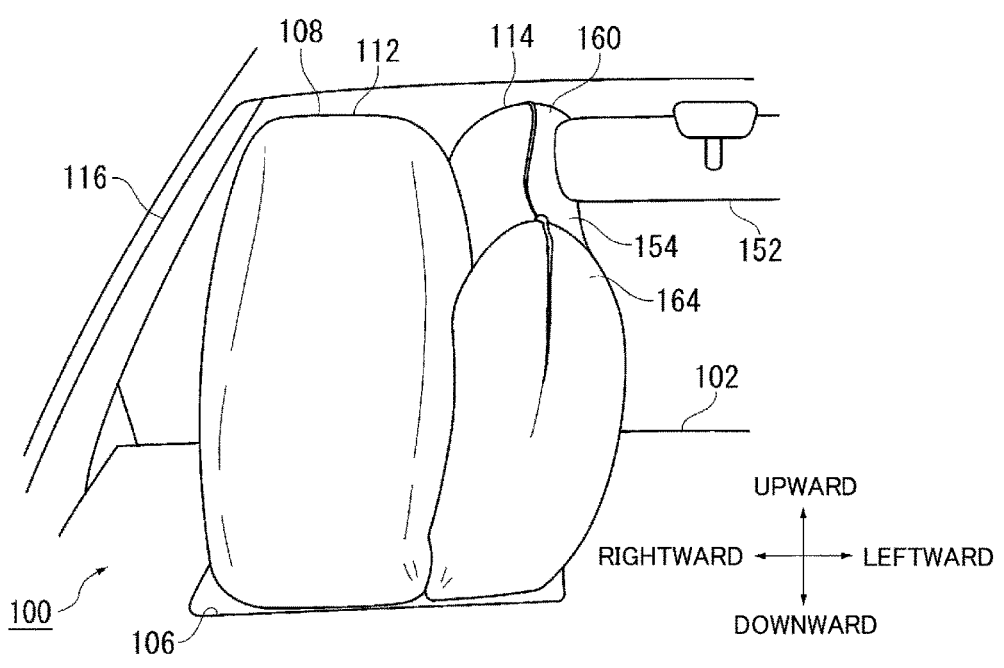

FIG. 3(b) is an exemplary view of the cushion 108 in FIG. 3(a) as viewed from the front side of the vehicle. As illustrated in FIG. 3(b), the front region 164 and the rear region 160 protrude upward in a curved mountain shape. The valley part between the front region 164 and the rear region 160 forms the avoidance-shaped part 154 to avoid the contact with the structure 152.

Figure 5A:
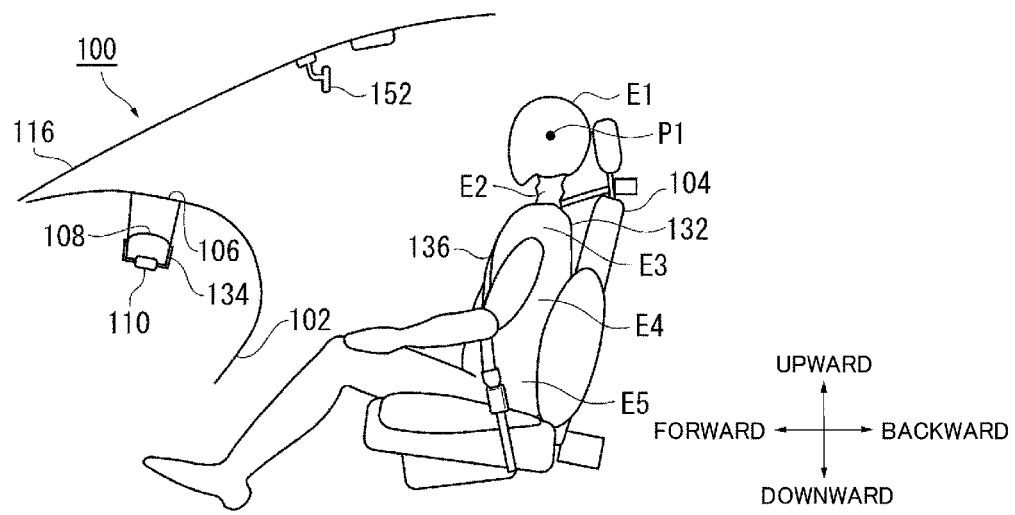
FIGS. 5(a), (b) and (c) are exemplary views illustrating the process of restraining the occupant by the cushion in FIG. 1(b).

FIGS. 5(a), (b) and (c) are exemplary views illustrating the process of restraining the occupant 132 by the cushion 108 in FIG. 1(b). The right part of each of the figures in FIG. 5 corresponds to the front side of the vehicle. FIG. 5(a) illustrates the cushion 108 yet to be deployed. As illustrated in FIG. 5(a), the cushion 108 is stored in a folded state in a housing 134. The housing 134 for example in the shape of a box open at the top stores the folded cushion 108, and the housing is stored inside the upper surface part 106 of the instrument panel 102.

The inflator 110 is fixed at the bottom of the housing 134. The inflator 110 is a gas generator and connected to the cushion 108 to supply gas. For example, a disk-shaped inflator is available as the inflator 110 while a cylinder type inflator may be used. Examples of widely available inflators include an inflator filled with a gas generating agent to generate gas by burning the gas generating agent, an inflator filled with compressed gas to supply the gas without heat generation, and a hybrid type inflator configured to use both combustion gas and compressed gas. Any type of inflator may be used as the inflator 110.

Figure 5B:
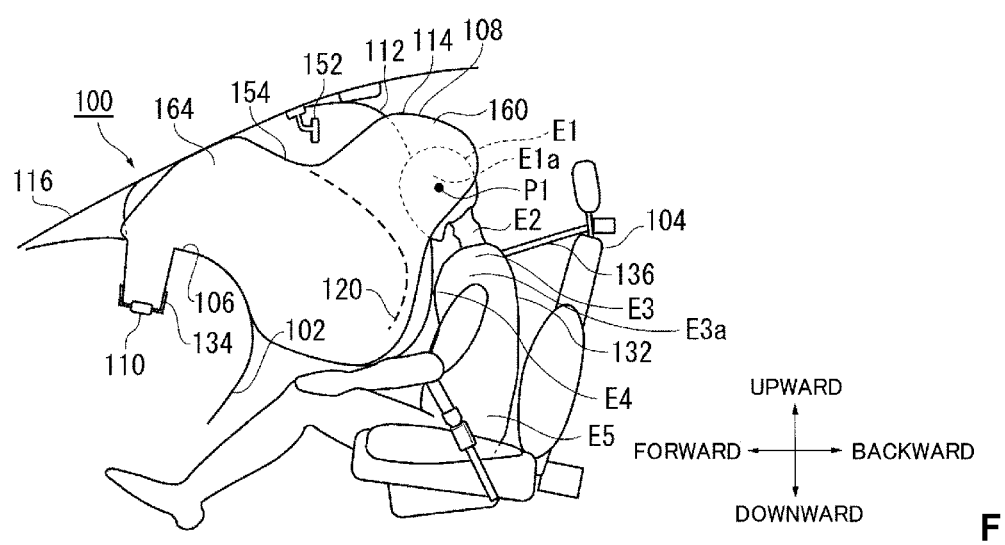

FIG. 5(b) is an exemplary view of the cushion 108 in an inflated and deployed state. The inflator 110 is activated in response to an impact detection signal from a sensor (not shown) and supplies gas to the main bag 112 and the center bag 114 of the cushion 108. The cushion 108 tears open the upper surface part 106 of the instrument panel 102 that serves as a lid for the housing 134 and is inflated and deployed the vehicle backward direction.

According to the embodiment, the avoidance-shaped part 154 avoids contact between the center bag 114 and the structure in the process of the inflation and deployment of the center bag 114. Therefore, the center bag 114 can be inflated and deployed accurately to a target region exactly in a set manner of deployment behavior. In its main deployment behavior, the cushion 108 is set to move from a lower position to a higher position by the manner of folding and rolling. The structure 152 enters into the avoidance-shaped part 154 from above. However, the cushion 108 is inflated and deployed in the vehicle backward direction from the housing 134, and therefore the center bag 114 also behaves to move in the vehicle backward direction. Therefore, according to the embodiment, the avoidance-shaped part 154 is recessed over a range between positions at prescribed distances from the structure 152 in vehicle forward and backward directions, respectively, rather than a range strictly around the structure 152. In this configuration, even if the center bag 114 moves backward or forward in the vehicle to some extent after the structure 152 enters into the avoidance-shaped part 154, the structure 152 can be prevented from contacting the center bag 114.

The occupant 132 illustrated in FIG. 5(b) enters further to the side of cushion 108 than the occupant 132 in FIG. 5(a). In an emergency event such as a vehicle collision, the occupant 132 moves in the vehicle forward direction by the inertia. When the occupant 132 wears the seatbelt 136 and the hips E5 are restrained, the occupant 132 moves along a trajectory as if the upper half of the body leans forward around the hips E5.

The main bag 112 restrains mainly the head E1, the shoulders E3, and the chest E4 of the occupant 132. The inflated and deployed main bag 112 is in contact with the windshield 116 and the upper surface part 106 of the instrument panel 102. The main bag 112 is inflated and deployed between the windshield 116 and the instrument panel 102 and therefore can restrain the occupant 132 entering thereinto in a stable position.

The center bag 114 protrudes beyond the main bag 112 to the vehicle rear side (the left part in FIG. 5(b)). In an oblique collision, the occupant 132 may sometimes move obliquely forward to the vehicle inner side particularly from the left shoulder E3a (see FIG. 6(a)) that is not restrained by the seatbelt 136. In this case, the occupant 132 contacts the center bag 114 from the side head part E1a (see FIG. 6(a)).

The rear region 160 protrudes upward from the avoidance-shaped part 154, so that a large restraining region for the side head part E1a of the occupant 132 is secured, and therefore the side head part E1a can be efficiently restrained. In addition, the front region 164 contacts and leans against the windshield 116 as a support. The center bag 114 contacts the upper surface part 106 of the instrument panel 102 as well as the windshield 116 and is inflated and deployed between them. The center bag 114 can restrain the occupant 132 entering thereinto from the back side in the vehicle in a stable position and provide high restraining capability by the configuration.

FIG. 5(c) is an exemplary view illustrating the state in which the occupant 132 in FIG. 5(b) has entered further into the cushion 108. As illustrated in FIG. 5(c), the head E1 of the occupant 132 moves to the vehicle front side while the side head part E1a (see FIG. 6(c)) is in contact with the center bag 114, enters into the valley 122, and is restrained therein. The left shoulder E3a (see FIG. 6(c)) of the occupant 132 on the vehicle inner side is restrained by a rear end 166 of the rear region 160 of the center bag 114. The rear end 166 is inclined to gradually protrude to the vehicle rear side in the upward direction. The rear end 166 of the rear region 160 restrains the left shoulder E3a from the vehicle front side and supports the upper half of the body of the occupant 132 together with the main bag 112. In this way, the twisting of the upper half of the body of the occupant 132 is cancelled.

The valley 122 is provided with the cushion connecting part 120 and can be kept narrow. The head E1 of the occupant 132 is received at the entrance of the valley 122 or entered into the valley 122 and sandwiched between the main bag 112 and the center bag 114 on the sides of the head as the head is restrained. At the time, the cushion connecting part 120 keeps the valley 122 narrow, and therefore the head E1 can be restrained by the side parts of the center bag 114 and the main bag 112 on both sides of the head. In addition, the cushion connecting part 120 is present on the vehicle front side of the head E1 entered into the valley 122, and therefore the load received from the head E1 can be optimally absorbed by the cushion connecting part 120.

When the occupant 132 is restrained, the avoidance-shaped part 154 avoids contact between the center bag 114 and the structure 152 so that, for example, generation of reaction force that would otherwise be caused by the contact between the center bag 114 and the structure 152 can be prevented, and the center bag 114 can provide restraining capability as set. The avoidance-shaped part 154 is provided to be recessed in a range positioned higher than the trajectory D1 of the center of gravity of head P1 while the occupant 132 is restrained. More specifically, the center bag 114 has its upper part reduced by providing the avoidance-shaped part 154 but is still configured to fully restrain the center of gravity of head P1 of the occupant 132. The front region 164 is in contact with the windshield 116, and therefore the position of the center bag 114 is stabilized while the occupant is restrained. The airbag device 100 having the configuration can provide high restraining capability to restrain the head E1 of the occupant 132 in an oblique collision, and the injury values can be reduced.

Since the contact between the center bag 114 and the structure 152 can be prevented by the avoidance-shaped part 154, the structure 152 can be prevented from becoming detached. Furthermore, the presence of the avoidance-shaped part 154 reduces the volume of the center bag 114 for the amount, the amount of base fabric for forming the center bag 114 can be reduced, and an inexpensive smaller power inflator may be used, which can contribute to reduction of the cost.

Now, the process of restraining the occupant 132 by the cushion 108 will be described with reference to views in different directions. FIGS. 6(a), (b) and (c) are exemplary views of the process of restraining the occupant 132 by the cushion 108 in FIGS. 5(a) to (c) as viewed from above. FIGS. 6(a) to 6(c) correspond to FIGS. 5(a) to 5(c).

As illustrated in FIG. 6(a), let us assume that the occupant 132 of the front passenger seat 104 is seated and wears the seatbelt 136. When the vehicle receives an impact in this state, an activation signal is transmitted from the sensor (not shown) to the airbag device 100, and the cushion 108 is inflated and deployed as shown in FIG. 6(b). In an oblique collision, the occupant 132 moves obliquely forward to the vehicle inner side. According to the embodiment, the center bag 114 protrudes beyond the main bag 112 in the vehicle backward direction, and the head E1 of the occupant 132 contacts a side surface part 162 of the center bag 114 on the vehicle outer side from the side head part E1a.

FIG. 6(c) is a view showing the state in which the occupant 132 in FIG. 6(b) has entered further into the cushion 108. In an oblique collision which applies an impact upon the vehicle obliquely in the front-back direction, the structure 152 such as a rear view mirror may be present in the direction in which the occupant 132 moves. However, the center bag 114 is prevented from contacting the structure 152 by the presence of the avoidance-shaped part 154 and can provide restraining capability as set without being caught by the structure 152 or receiving unexpected reaction force from the structure 152.

If the head E1 of the occupant 132 moving obliquely forward contacts the main bag 112 present in front of the front passenger seat 104, clockwise rotating force (rotation 140 indicated by the arrow) around the neck E2 as an axis may be generated at the head E1 as viewed from above. In this case, the head E1 of the occupant 132 moving obliquely forward to the vehicle inner side is restrained as the head is received by the valley 122 near its entrance while the side head part E1a is in contact with the center bag 114 or as the head enters into the valley 122. The rotation 140 generated at the head E1 can be reduced or cancelled efficiently by the configuration. The angular velocity of the rotation 140 of the head E1 of the occupant 132 can be reduced, so that the injury value for the head E1 associated with the rotation 140 can be reduced.

The rear region 160 of the center bag 114 restrains the left shoulder E3a of the occupant 132 by its rear end 166. The occupant 132 is restrained from the right shoulder E3b on the vehicle outer side to the flank on the vehicle inner side by the seatbelt 136 but the left shoulder E3a is not restrained by the seatbelt 136. Therefore, in an oblique collision, the occupant may move obliquely forward in the vehicle while projecting the shoulder E3a ahead in some cases. In this case, the rear end 166 of the center bag 114 restrains the left shoulder E3a from the front and above ad then the main bag 112 restrains the right shoulder E3b. According to the embodiment, in particular, the cushion connecting part 120 connects the center bag 114 to the main bag 112, and therefore the center bag 114 is in a stable position and capable of optimally restraining the left shoulder E3a.

As in the foregoing, according to the embodiment, the side head part E1a can be restrained using the center bag 114 and the angular velocity of the rotation 140 of the head E1 can be reduced. In addition, the left shoulder E3a can be positively restrained to cancel the rotation generated at the upper half of the body. In particular, the contact between the center bag 114 and the structure 152 at the upper part of the vehicle interior can be avoided by the presence of the avoidance-shaped part 154, so that the center bag 114 can fully provide its essential restraining capability and efficiently reduce injury values related to the occupant 132.

In the above description, with reference to FIG. 6(b), etc. the contact between the occupant 132 and the cushion 108 starts as the side head part E1a contacts the center bag 114. However, the contact between the occupant 132 and the cushion 108 may be caused in various other cases, for example the head E1 may contact the center bag 114 and the main bag 112 at the same time, or the head E1 may contact the main bag 112 first. The shoulder E3 (see FIG. 5(b), etc.) or the chest E4 may contact the main bag 112, etc. and then the head E1 may contact the main bag 112, etc. However, in any of the cases, the head E1 of the occupant 132 can be restrained effectively using the valley 122 by the configuration according to the embodiment.

FIG. 6(b) illustrates the clockwise rotation 140 as an example of the rotation that may be generated at the head E1. However, for example in a front passenger seat in a right-hand drive car, anti-clockwise (or counter-clockwise) rotation around the neck E2 may be generated at the head E1 as viewed from above. In this case, for example, the positions of the main bag 112 and the center bag 114 according to the embodiment may be replaced, so that the anti-clockwise rotation can be reduced or cancelled, and the angular velocity of the head E1 can be reduced. With the features of the airbag device 100, the same advantageous effects can be provided for either of the clockwise and anti-clockwise rotations generated at the head E1.

FIGS. 7(a) to 9 illustrate modifications of the airbag device 100 illustrated in FIG. 3(a). These modifications are different from the airbag device 100 illustrated in FIGS. 1(a) to 5(c) mainly in the shapes of the center bags. Now, the modifications will be described one by one. The elements already described will be designated by the same reference characters and their description will not be repeated. The elements having the same names as those already described have the same functions and effects even though their reference characters are different.

Figure 7A:
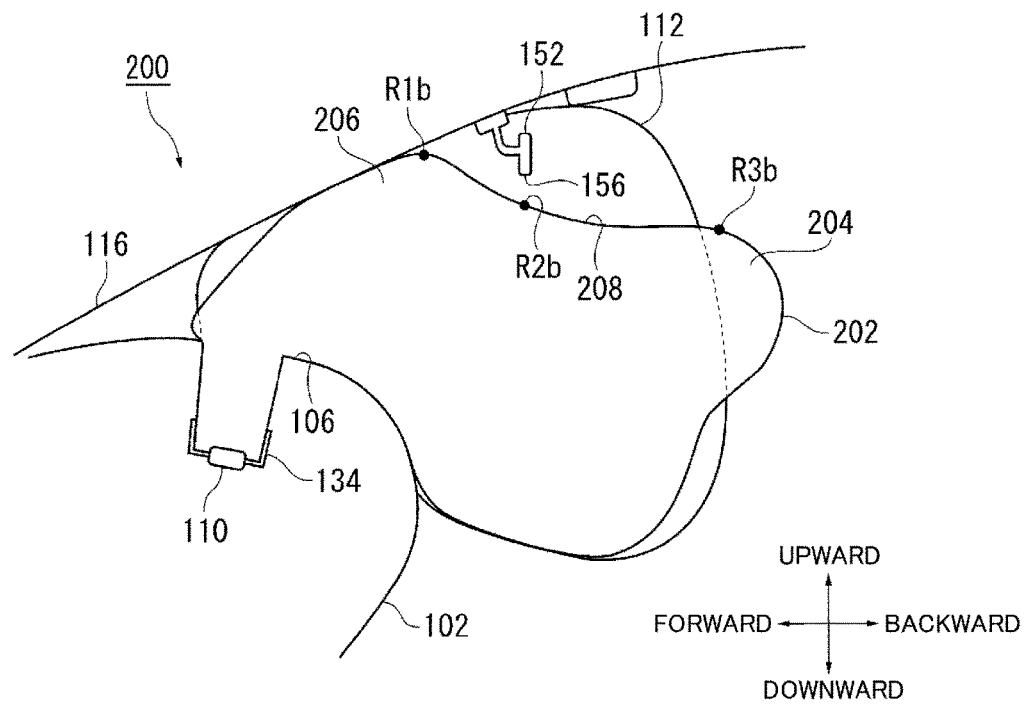
FIGS. 7(a) and (b) are exemplary views illustrating a modification of the airbag device illustrated in FIG. 3(a).

In an airbag device 200 according to a first modification illustrated in FIG. 7(a), a third point R3b as the peak of a rear region 204 of a center bag 202 is in a lower position than a first point R1b as the peak of a front region 206 and a second point R2b immediately below a structure 152 in an avoidance-shaped part 208 (first point R1b>second point R2b>third point R3b). Also in this configuration, the device can optimally restrain an occupant 132 (see FIG. 5(c)) while avoiding the structure 152. Note that also in the configuration, the third point R3b is set above the trajectory D1 of the center of gravity of head P1 of the occupant 132, so that the capability of restraining the head E1 can be maintained.

Figure 7B:
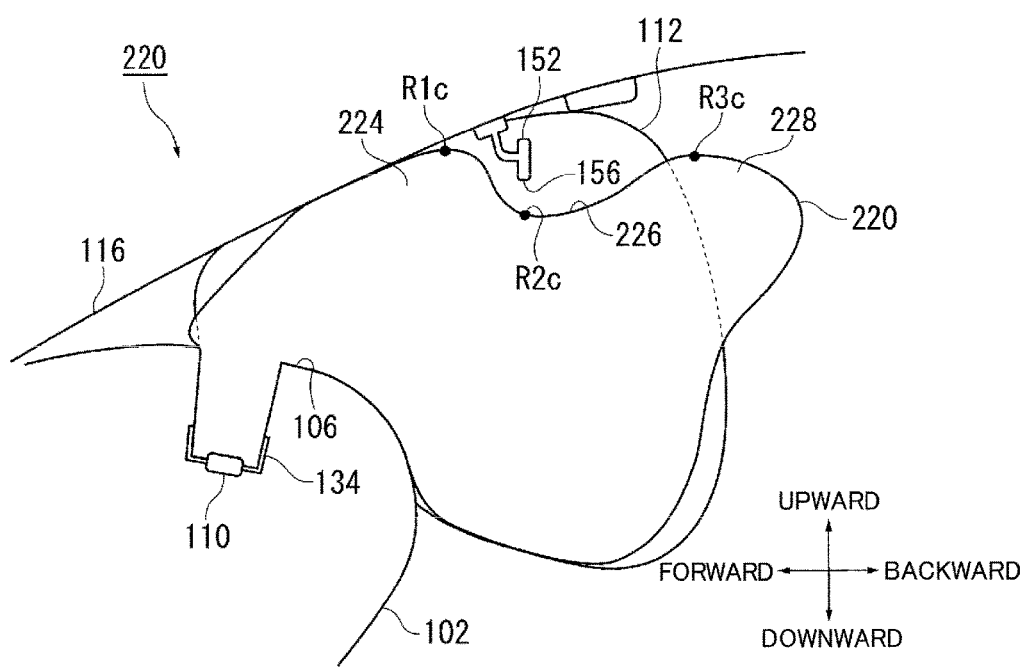

In an airbag device 220 according to a second modification illustrated in FIG. 7(b), a first point R1c as the peak of a front region 224 is provided in a higher position than a second point R2c in an avoidance-shaped part 226 of a center bag 222 immediately under the structure 152 and a third point R3c as the peak of a rear region 228 (first point R1c>second point R2c>third point R3c). In this configuration, the amount of the front region 224 protruding upward is large, and therefore a larger contact area is secured between the front region 224 and the windshield 116, so that the position of the center bag 222 can be more stable when the occupant is restrained.

Figure 8A:
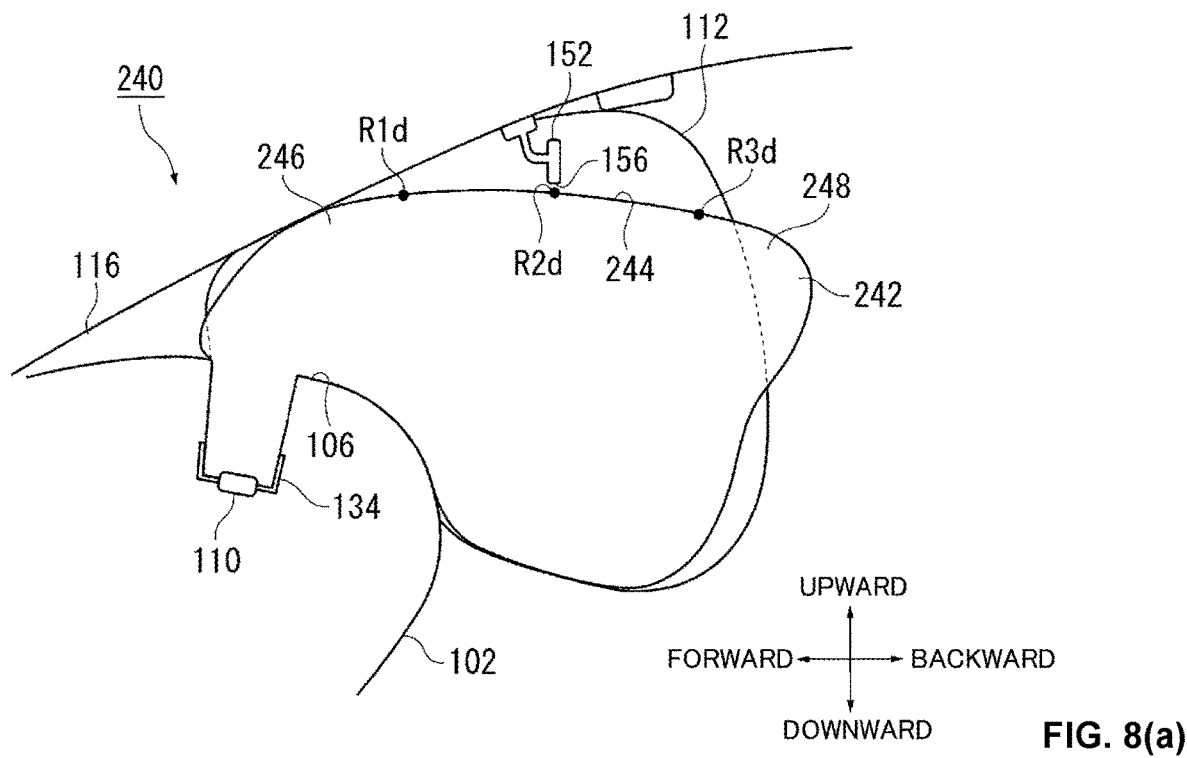
FIGS. 8(a) and (b) are exemplary views illustrating a modification of the airbag device illustrated in FIG. 3(a).

In a center bag 242 in an airbag device 240 according to a third modification illustrated in FIG. 8(a), a first point R1d in a front region 246 and a third point R3d in a rear region 248 are set corresponding to the positions of the first point R1a and the third point R3a in the center bag 114 shown in FIG. 3(a). In the center bag 242, a second point R2d in an avoidance-shaped part 244 immediately under the structure 152 is provided in a higher position than a first point R1d and a third point R3d (second point R2d>first point R1d>third point R3d). In the configuration, the upper edge of the center bag 242 extends in a parabola. If for example the rear region 248 does not protrude upward and still a region for restraining the occupant can be secured, the center bag 242 in this configuration can fully restrain the occupant 132 while avoiding contact with the structure 152.

Figure 8B:
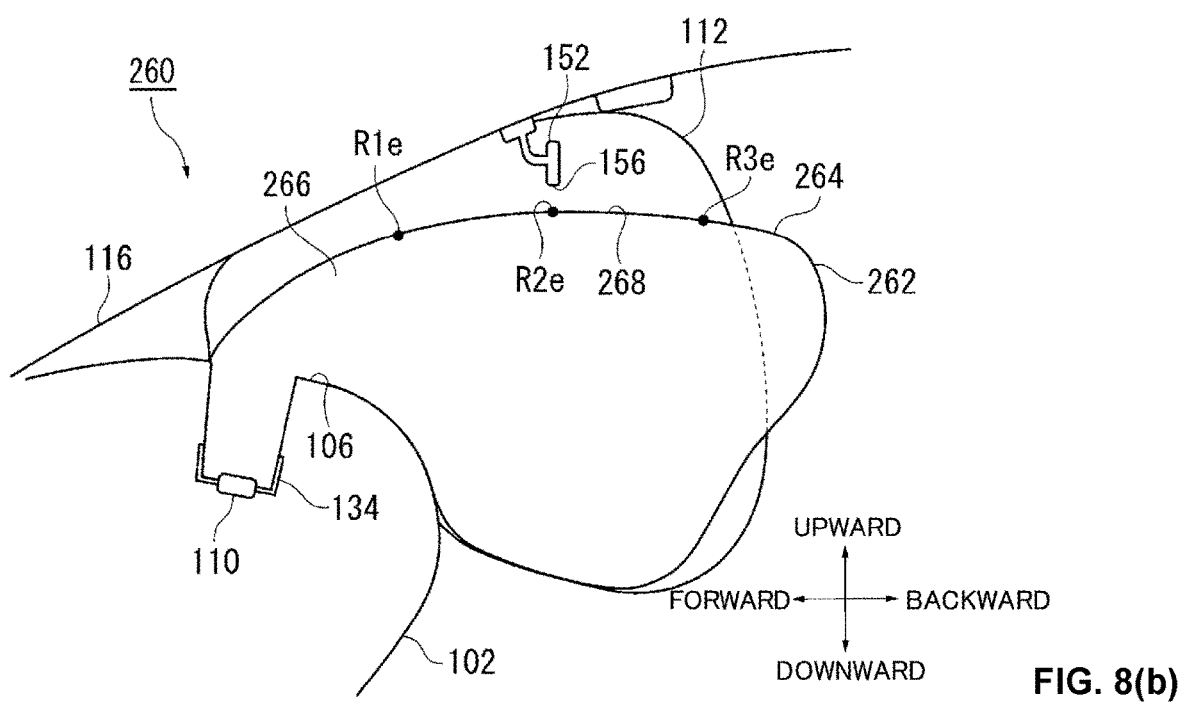

In a center bag 262 in an airbag device 260 according to a fourth modification illustrated in FIG. 8(b), a first point R1e in a front region 266 and a third point R3e in a rear region 264 are set corresponding to the positions of the first point R1a and the third point R3a in the center bag 114 shown in FIG. 3(a). In the center bag 262, the third point R3e in the rear region 264 is set lower than a second point R2e in an avoidance-shaped part 268 and higher than the first point R1e in the front region 266 (second point R2e>third point R3e>first point R1e). In the configuration, while the front region 266 is not in contact with the windshield 116, the center bag 262 can keep its position by contacting the instrument panel 102. This configuration can also optimally provide the occupant restraining capability while avoiding contact between the center bag 262 and the structure 152.

Figure 9:
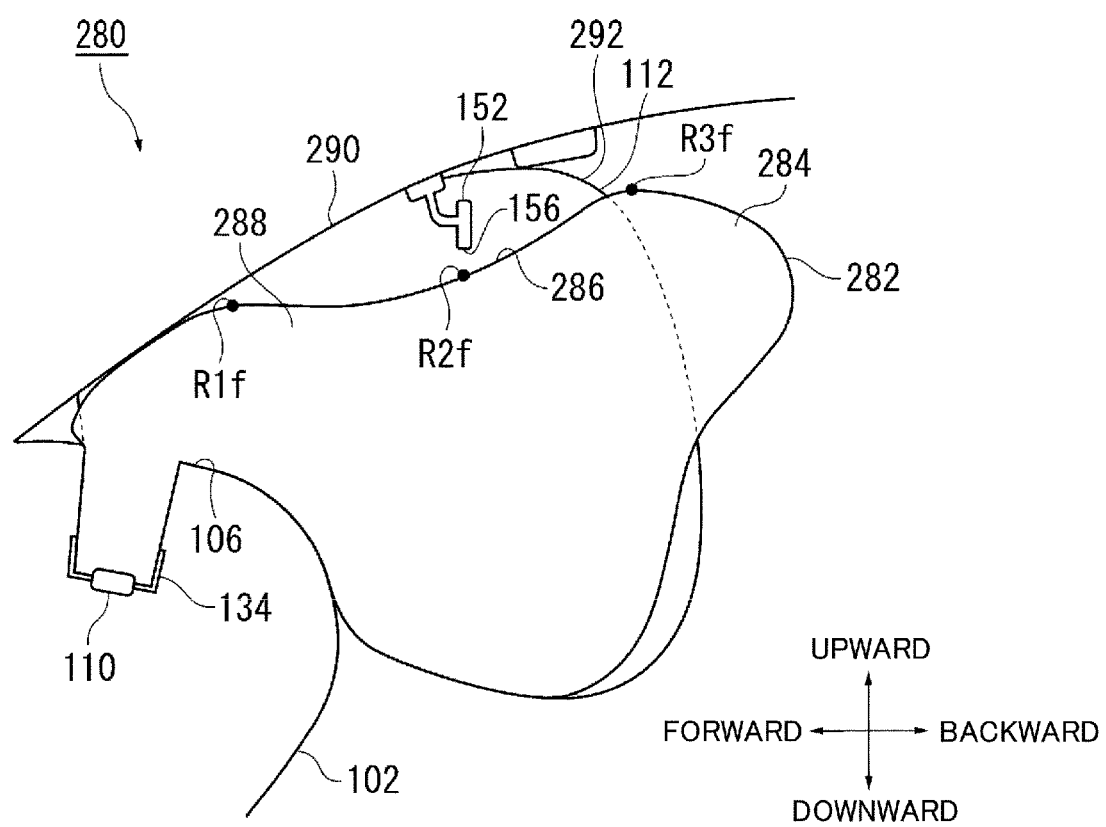
FIG. 9 is an exemplary view illustrating a modification of the airbag device illustrated in FIG. 3(a).

In an airbag device 280 according to a fifth modification illustrated in FIG. 9, a third point R3f as the peak of a rear region 284 in a center bag 282 is set higher than a second point R2f in an avoidance-shaped part 286 immediately under the structure 152, and a first point R1f as the peak of a front region 288 is set in the lowest position. In FIG. 9, in a vehicle provided with a windshield 290 having a large angle, the airbag device 280 has a cushion 292 provided in a position near the windshield 290. In this case, the airbag device 280 can restrain an occupant while optimally contacting the front region 288 to the windshield 290 and avoiding the structure 152.

Note that in the above-described configurations, each of the cushions has two parts, a main bag and a center bag, and an avoidance-shaped part is formed at the upper part of the center bag. However, the avoidance-shaped part does not have to be provided in the center bag and may be optimally provided at a cushion consisting of a single part.

While the preferred embodiment of the present invention has been described in conjunction with the accompanying drawings, the described embodiment is simply a preferred example of the invention, and other embodiments may be carried out or achieved by various other methods. The present invention is not limited to the detailed shapes, sizes, configurations, positional arrangements, etc. illustrated in the accompanying drawings unless otherwise specified herein. The expressions and terms herein are used simply for the purpose of illustration and should not be construed as limiting unless otherwise specified.

Therefore, it is to be understood that modifications and variations will be apparent to those skilled in the art within the scope of claims and that the modifications and variations naturally fall within the technical scope of the present invention.

The invention claimed is:

1. An airbag device adapted to be provided for an occupant in a vehicle having a prescribed structure suspended from an upper part of a vehicle interior, the airbag device comprising:
   a cushion adapted to be inflated and deployed into a bag shape to restrain the occupant of a seat from a front side; and
   an avoidance-shaped part formed as a u-shaped recess and provided at an upper part of the cushion to avoid contact between the inflated and deployed cushion and the structure, the avoidance-shaped part being recessed downward over a range between a first point at a first prescribed distance from the structure in a vehicle forward direction and a third point at a third prescribed distance from the structure in a vehicle rearward direction such that a second point between the first and third points is disposed under the structure and is lower than each of the first and third points,
   wherein the avoidance-shaped part having the u-shaped recess is laterally opened in a vehicle widthwise direction.

2. The airbag device according to claim 1, further comprising wherein the cushion is adapted to restrain the occupant of one of a left seat and a right seat, and
   the avoidance-shaped part is provided at the upper part of the cushion on a vehicle inner side in the vehicle widthwise direction.

3. The airbag device according to claim 1, further comprising the avoidance-shaped part is recessed in a range positioned higher than a trajectory of a center of gravity of a head of the occupant when the occupant is restrained.

4. The airbag device according to claim 1, further comprising a housing having a box shape for storing the cushion and provided inside an upper surface part of an instrument panel of the vehicle, wherein
   the cushion tears open the upper surface part of the instrument panel upon the cushion being inflated and deployed.

5. The airbag device according to claim 1, further comprising the cushion is inflated and deployed to contact a windshield of the vehicle and an upper surface part of an instrument panel of the vehicle.

6. The airbag device according to claim 1, wherein the prescribed structure is a rearview mirror.

7. An airbag device provided for an occupant in a vehicle having a prescribed structure suspended from an upper center of a vehicle interior in a vehicle widthwise direction, the airbag device comprising:
   a main bag adapted to be inflated and deployed in front of a seat,
   a center bag adapted to be inflated and deployed on an inner side of the main bag in the vehicle widthwise direction; and
   an avoidance-shaped part provided at an upper part of the center bag and recessed downward to avoid contact between the center bag and the structure upon deployment of the main bag and the center bag,
   wherein the center bag includes a rear region provided in a vehicle rearward direction from the structure and a front region provided in a vehicle forward direction from the structure,
   wherein the avoidance-shaped part includes a valley part disposed between the front region and the rear region, and the valley part is lower than the front region and the rear region, and
   wherein the avoidance-shaped part having the valley part is laterally opened in the vehicle widthwise direction.

8. The airbag device according to claim 7, wherein the avoidance-shaped part is recessed downward over a range between positions at prescribed distances from the structure in the vehicle forward and rearward directions upon deployment of the main bag and the center bag.

9. The airbag device according to claim 7, further comprising the avoidance-shaped part being recessed in a range positioned higher than a trajectory of a center of gravity of a head of the occupant when the occupant is restrained.

10. The airbag device according to claim 7, further comprising the center bag protruding beyond the main bag in the vehicle rearward direction during inflation and deployment.

11. The airbag device according to claim 7, further comprising the center bag being inflated and deployed to contact a windshield of the vehicle and an upper surface part of an instrument panel of the vehicle.

12. The airbag device according to claim 7, further comprising the main bag and the center bag being bag-shaped, and
  the airbag device further comprises a cushion connecting part that connects the main bag and the center bag ahead of a rear edge of the main bag, and
  a valley adapted to restrain a head of the occupant between the main bag and the center bag behind the cushion connecting part.

13. The airbag device according to claim 7, further comprising a housing having a box shape, storing the main bag and the center bag and provided inside an upper surface part of an instrument panel of the vehicle, wherein
  the main bag and the center bag tear open the upper surface part of the instrument panel to be inflated and deployed.

14. The airbag device according to claim 7, wherein the prescribed structure is a rearview mirror.

* * * * *